_United States Patent_ [19]

Miyaoka

[11] Patent Number: 4,999,827
[45] Date of Patent: Mar. 12, 1991

[54] RECORDING AND/OR REPRODUCING APPARATUS FOR TAPE TYPE OPTICAL RECORDING MEDIUM

[75] Inventor: Senri Miyaoka, Kanagawa, Japan

[73] Assignee: Sony Corporation, Tokyo, Japan

[21] Appl. No.: 280,938

[22] Filed: Dec. 7, 1988

[30] Foreign Application Priority Data

Dec. 29, 1987 [JP] Japan .................. 62-336509

[51] Int. Cl.$^5$ ................................ G11B 7/00
[52] U.S. Cl. ..................... 369/44.18; 369/97
[58] Field of Search .............. 346/76 L; 369/44.14, 369/44.17, 44.18, 97, 117, 93, 94

[56] References Cited

U.S. PATENT DOCUMENTS

| | | | |
|---|---|---|---|
| 3,262,122 | 7/1966 | Fleisher et al. ........................ 346/1 |
| 3,314,075 | 4/1967 | Becker et al. ...................... 346/108 |
| 3,679,817 | 7/1972 | Goldmark ............................ 369/97 |
| 3,703,724 | 11/1972 | Thomas ................................. 369/97 |
| 3,841,733 | 10/1974 | Ebersole ............................... 350/160 |
| 4,199,783 | 4/1980 | Huignard et al. .................... 358/132 |
| 4,633,455 | 12/1986 | Hudson ............................. 369/44.18 |

OTHER PUBLICATIONS

Patents Abstract of Japan, vol. 10, No. 190, Jul. 4, 1986.

_Primary Examiner_—Donald McElheny, Jr.
_Attorney, Agent, or Firm_—Ronald P. Kananen

[57] ABSTRACT

A recording and/or reproducing apparatus for a tape type optical recording medium has a transparent guide on which guide tracks are precisely formed. A scanning beam is controlled so as to scan along the guide tracks and is converged on the recording surface of the tape type recording medium. The accuracy of the recording tracks on the tape is equivalent to that of the guide tracks. In this way, recording tracks can be precisely formed on the tape witout the step required in the prior art methods of pre-forming guide tracks on the recording medium.

16 Claims, 3 Drawing Sheets

RECORDING AND/OR REPRODUCING APPARATUS FOR TAPE TYPE OPTICAL RECORDING MEDIUM

BACKGROUND OF THE INVENTION

1. Field of the Invention

The present invention relates generally to a recording and/or reproducing apparatus, particularly to a recording and/or reproducing apparatus which is capable of forming recording tracks of a tape type optical recording medium at a high recording density by an optical scanning beam for scanning the surface of the recording medium.

2. Description of the Prior Art beam

Recently, various recording and/or reproducing apparatus for recording high density information by means of an optical scanning beam, have been proposed and developed.

A recording and/or reproducing apparatus, wherein an optical disc is used as a recording medium, is well known. In the manufacturing process of such a disc type recording medium, guide grooves are initially formed on the surface of a pilot disc by a highly accurate cutting machine. The guide grooves are then transferred from the pilot disc onto an optical recording medium. In this manufacturing method, the mechanical accuracy of the cutting machine is very important in the formation of the guide grooves. In general, the guide grooves are formed on the surface of the pilot disc at a pitch of 1 to 2 $\mu$m depending upon the accuracy of the cutting machine. The accuracy of the grooves transferred onto the recording medium is substantially the same as that of the pilot disc. These grooves formed on the surface of the recording medium are referred to as pre-grooves. In such apparatus, when information is recorded or reproduced by means of a scanned beam, pre-grooves are scanned by the scanning beam which is guided by a tracking servo means. As a result, high density recording tracks are recorded on the surface of the recording medium.

An alternative recording and/or reproducing apparatus wherein optical tape is used as the optical recording medium has been disclosed in the U.S. Pat. No. 4,199,783 and the U.S. Pat. No. 3,262,122.

In the prior art manufacturing process for such optical tape, guide grooves are transferred from the pilot tape onto the optical tape. With such process, a highly accurate transfer is difficult due to slippage between the pilot tape and the optical tape.

SUMMARY OF THE INVENTION

Therefore, it is an object of the disclosed invention to provide a recording and/or reproducing apparatus by which high density recording tracks are accurately formed on a tape type recording medium without pre-forming guide grooves onto the recording medium.

In order to accomplish the aforementioned and other objects, a recording and/or reproducing apparatus for a tape type optical recording medium according to the present invention comprises scanning means for emitting a scanning beam having recording information onto the recording surface of the recording medium, guide means having light-transmitting properties, the guide means being capable of transmitting the scanning beam and having a mating surface which mates with the recording surface on which is formed a recording guide track for guiding the scanning beam onto the recording medium, and the scanning means controlling the scanning beam in such a manner that the scanning beam is focused on, and scans along, the recording guide track.

A plurality of parallel recording guide tracks may be provided on the guide means. The guide means may be comprised of a flat strip or a cylindrical drum. The recording guide track is preferably inclined at a predetermined angle to the longitudinal axis of the tape type recording medium. The recording guide track may consist of a groove or a projection.

Alternatively, the recording medium may be received on a pair of reels enclosed in a casing which has a light-transmitting window through which the scanning beam is emitted onto the recording surface of the tape type recording medium. The guide means is arranged in said casing in a closed-loop fashion. The guide means move along with the recording medium. The guide means are formed of a flexible material, such as a clear or translucent rubber. The guide means encircle the recording medium received on the pair of reels.

The scanning means include a light source for emitting the scanning beam, a converging means for converging the scanning beam, and a control means for controlling the light source and the converging means so as to scan the scanning beam along the recording guide track. The scanning beam is selected from the group comprising visible radiation, ultraviolet radiation, infrared radiation, and X-ray. The converging means may consist of a convex lens.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment, and are for explanation and understanding only.

In the drawings.

DESCRIPTION OF THE PREFERRED EMBODIMENTS

Figure 1:
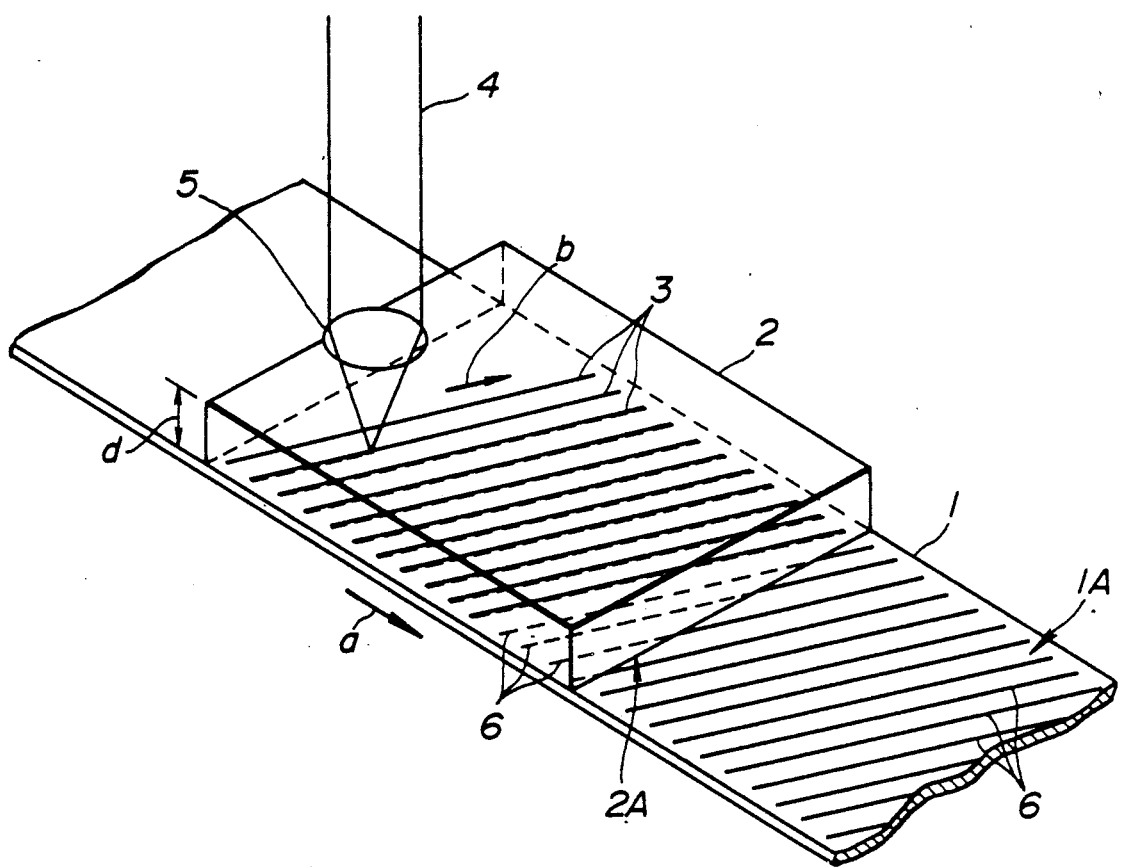
FIG. 1 is a schematic perspective view illustrating the essential parts of the recording and/or reproducing apparatus according to the invention.

Referring now to FIG. 1, a tape type optical recording medium 1 of a recording and/or reproducing apparatus according to the invention is continuously or intermittently run in the direction a. A recording surface 1A of the tape 1 mates with a mating surface 2A of a guide plate 2 which has a thickness d of approximately 1.2 mm and is comprised of a transparent or translucent material. The mating surface 2A is formed with a plurality of guide tracks 3 which obliquely traverse the recording surface 1A of the tape. A scanning beam 4 emitted from a light source (not shown) provided in the recording and/or reproducing apparatus, scans the guide tracks 3 in a scanning direction b. A converging means 5 is arranged in a recording head (not shown) of the apparatus so as to converge the scanning beam 4.

In this construction, when the recording and/or reproducing apparatus is in a recording mode, the tape 1 is run in the direction a, while the mating surface 2A is kept in firm contact with the recording surface 1A so that there is no relative displacement between the former and the latter The scanning beam 4 scans the guide tracks 3 in the scanning direction b. In this way, a plurality of recording tracks 6 are formed on the recording surface 1A of the tape 1.

If a tracking error occurs while the scanning beam 4 scans the guide track 3, a control unit (not shown) provided in the recording and/or reproducing apparatus moves the converging means 5 perpendicularly to the scanning direction b so as to align it with the guide track.

Further, if focus error occurs while the scanning beam 4 scans the guide track 3, the converging means 5 is moved closer to or further from the optical source (not shown) of the scanning beam 4 so that the scanning beam converges on one of the guide tracks 3.

The guide plate 2 serves as a highly accurate guide through which high density recording tracks 6 can be accurately formed on the recording surface 1A. That is to say, the accuracy of the recorded tracks 6 on the tape 1 is essentially equivalent to that of the plurality of guide tracks 3 on the guide plate 2. Therefore, if the track pitch of the guide plate 2 is highly accurate, the recording tracks may be formed very accurately on the recording surface of the tape 1.

In practice, the guide tracks 3 are formed as grooves on the guide plate 2 by means of a highly accurate cutting machine. The accuracy of the recording tracks formed on the optical tape by an apparatus employing such a guide means is equivalent to that of the recording tracks formed on laser discs.

When the recording and/or reproducing apparatus is in a reproducing mode, a scanning beam emitted from a reproducing head (not shown) scans the recording tracks 6 and as a result information or data in the tracks are reproduced.

Figure 2:
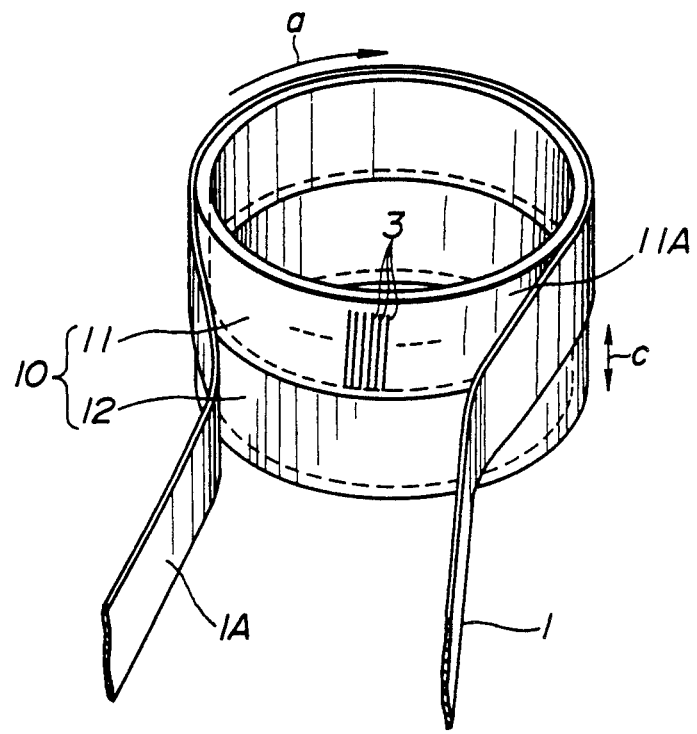
FIG. 2 is a perspective view showing the essential parts of the recording and/or reproducing apparatus of the first embodiment according to the invention.
Figure 3:
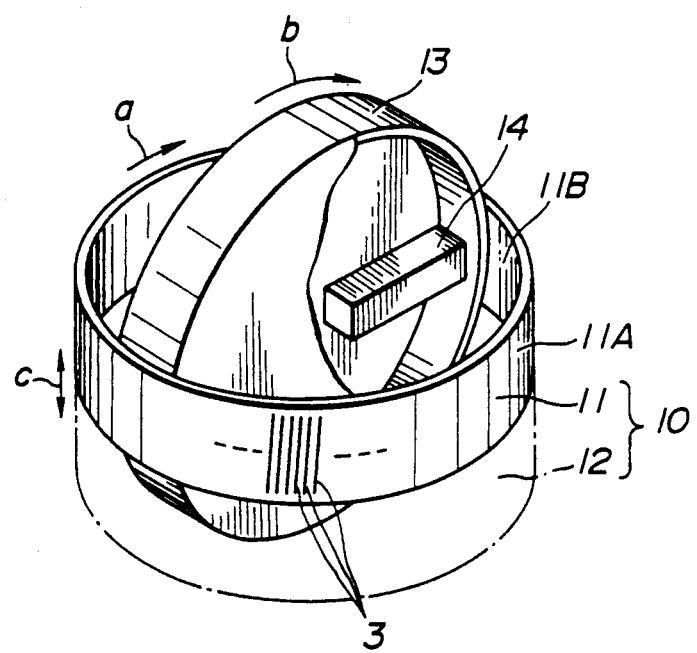
FIG. 3 is a perspective view showing the essential parts of the recording and/or reproducing apparatus including a recording and/or reproducing head of the first embodiment according to the invention.

FIGS. 2 and 3 show the essential parts of a recording and/or reproducing apparatus of the first embodiment according to the invention.

As shown in FIGS. 2 and 3, the guide member is comprised of a cylindrical drum 10 having an upper portion 11 and a lower portion 12. The upper and lower cylindrical portions consist of materials having light transmitting properties and their thicknesses are the same. The outer peripheral surface 11A of the upper cylindrical portion 11 is formed with a plurality of guide grooves 3, but the inner and outer peripheral surfaces of the lower cylindrical portion 12 have no guide grooves. The tape 1 is fed onto the outer peripheral surface 11A of the upper cylindrical portion 11 and is run in the direction a, while the cylindrical drum 10 is rotated at the feed rate so that no slipping occurs between the outer peripheral surface 11A and the recording surface 1A.

The cylindrical drum 11 can slide in its axial direction c between a first position and a second position. The first position is that shown in FIGS. 2 and 3. In the first position, the recording and/or reproducing apparatus is in the recording mode. When the drum 10 is moved upward from the first position to the second position and the outer peripheral surface of the lower cylindrical portion 12 mates with the recording surface 1A, the recording and/or reproducing apparatus is in the reproducing mode.

As shown in FIG. 3, a head drum 13 is arranged within the internal space defined by the inner peripheral surface of the cylindrical drum 2. A recording/reproducing head 14 is provided at a position of the periphery of the head drum 13. The recording/reproducing head 14 includes a light source and a converging means. The rotational plane of the head drum 13 is slightly oblique to the rotational axis of the cylindrical drum 10 so that, when the head drum rotates at a predetermined rate, the scanning beam 4 from the head 14 scans the recording surface 1A of the tape in the predetermined scanning direction b.

In this construction, when the apparatus is in the recording mode, the scanning beam 4 from the head 14 passes through the upper cylindrical portion 11 onto the guide tracks 3 of the outer peripheral surface 11A which focus the scanning beam so as to form precisely aligned parallel recording tracks on the recording surface 1A at the predetermined track pitch.

When the apparatus is in the reproducing mode, the scanning beam 4 from the head 14 is emitted through the lower cylindrical portion 12 onto the recording surface 1A and scans of the recorded tracks 6 of the tape 1.

According to the construction of the first embodiment, the recording medium 1 is run in continuous contact with the guide tracks 3 and recording tracks can be continuously formed on the recording surface 1A.

Figure 4:
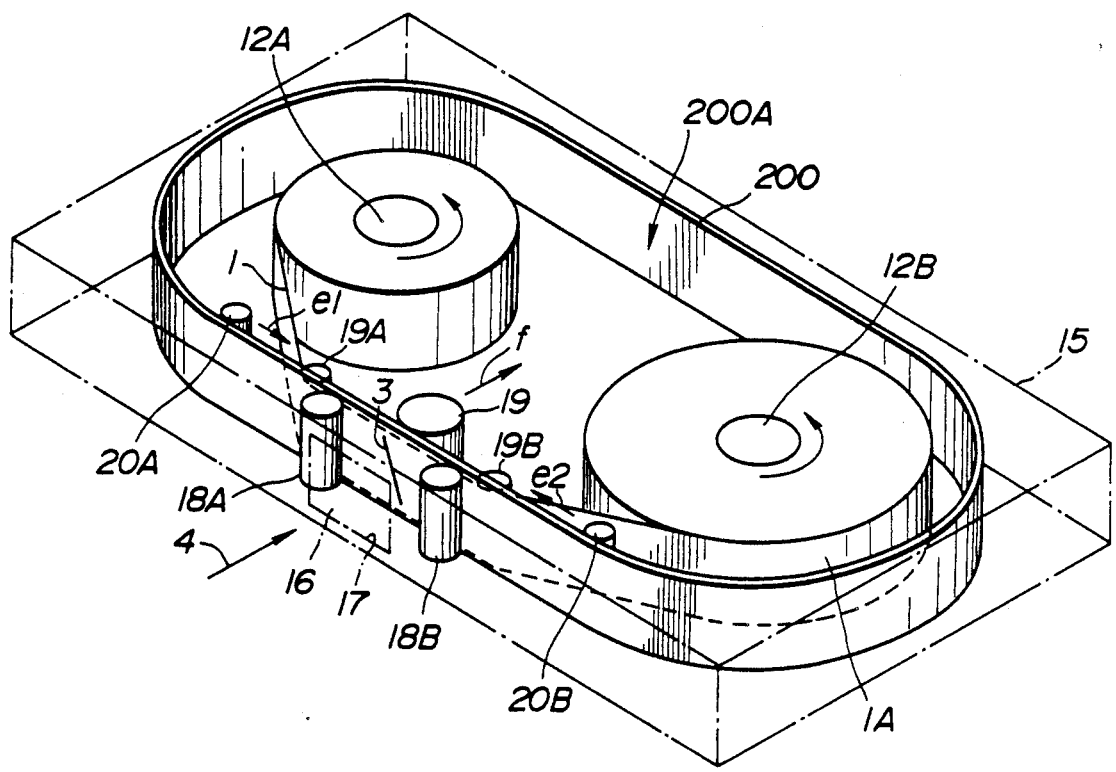
FIG. 4 is a perspective view illustrating an optical tape cassette according to the second embodiment of the invention.

FIG. 4 shows a recording and/or reproducing apparatus of the second embodiment according to the invention. In FIG. 4 like reference numerals to those used in connection with the first embodiment denote like elements.

As clearly seen in FIG. 4, the second embodiment is particularly different from the first embodiment in that a closed-loop type guide member 200 is so arranged as to enclose the reels on which the recording medium is received.

In the second embodiment, the tape type recording medium 1 is wound about a supply reel 12A and a take-up reel 12B which are enclosed within an internal space defined by a rectangular casing 15. A transparent plate 16 covers a small rectangular opening 17 provided in the center of a side wall of the casing 15. A pair of pinch rollers 18A and 18B project from the bottom surface of the casing 15 near either side of the transparent plate 16 and a capstan 19 is provided about midway between the pair of pinch rollers. The tape 1 passes from the supply reel 12A across the first pinch roller 18A, the capstan 19, and the second pinch roller 18B to the take-up reel 12B. A pair of movable pins 19A and 19B are arranged at either side of the capstan 19 at a greater distance therefrom than that between the capstan 19 and the pair of pinch rollers 18A and 18B. The surface of tape 1 is arranged in parallel with the face of the transparent plate 16 through which the scanning beam 4 is transmitted onto the surface of the tape 1. On the other hand, the closed-loop type guide member 200 is arranged in the casing 15 so as to pass between the pair of pinch rollers and the recording surface 1A, which is kept in firm contact with an inner peripheral surface 11B of the guide loop 200. The guide loop 200 consists of a transparent flexible rubber material.

When the recording and/or reproducing apparatus is in the recording mode as shown in FIG. 4, the guide loop 200 is sandwiched between the pair of pinch rollers and the capstan and a portion of the tape 1 mates with the mating surface 200A. Under these conditions, the tape 1 and the guide loop 200 are run together at a predetermined speed which is determined by a rotational speed of the capstan 19, while the scanning beam 4 scans the guide track 3 on the mating surface 200A. Recording tracks 6 are thus formed on the recording surface 1A by the pattern of the guide tracks 3.

When the recording and/or reproducing apparatus is in the reproducing mode, a pair of outside guide pins 20A and 20B which are arranged outside of the pair of pinch rollers 18A and 18B, are moved near the capstan 19 in the directions shown by the arrows e1 and e2 with the result that the capstan 19, the movable pins 19A and 19B, and the portion of the tape 1 between the two pinch rollers 18A and 18B are moved away from the inner surface of the guide loop 200 in the direction f. During the reproducing mode, the tape 1 is run at a predetermined speed as the predetermined distance is kept between the mating surface 200A and the recording surface 1A in the above manner. In this mode, the scanning beam 4 from a reproducing head (not shown) is not converged on the guide tracks 3 of the guide loop 200 but on the recording surface 1A. As a result the effect of the guide tracks 3 on the beam spot of the scanning beam 4 becomes insubstantial, thereby allowing the reproduction of the recording tracks 6 without influence by the guide tracks 3.

Although in the first and second embodiments, visible radiation is used as a scanning beam, ultraviolet radiation, infrared radiation, X-ray or the like may be used as a scanning beam.

In the disclosed embodiment, the guide tracks are parallel; however, modifications can be conceived in which the guide tracks are arranged at mutually different predetermined angles.

In the preferred embodiments, the guide track 3 is a groove. However, the guide track may take the form of a projection. Alternatively, the guide tracks may take the form of the transparent or translucent member in which the transmission factors are mutually different so as to form a predetermined pattern of the guide tracks.

Furthermore, although the tape and the guide member run at the same rate in the preferred embodiments, a speed difference of a predetermined constant value may be used.

Moreover, in the present embodiments, although the optical tape and the guide member are continuously run, the optical tape and the guide member may be run intermittently. That is to say, the guide member may take the form of a stationary window in which the guide tracks are formed and the scanning means is scanned along two axes so as to scan the section of tape under the guide member. In this case, the tape would be run intermittently and scanned a section at a time.

The present invention may be embodied in other specific forms without departing from the spirit or essential characteristics thereof. Therefore, the invention should be understood in all respects as defined by the appended claims rather than by the foregoing description and all modifications which come within the meaning and range of equivalency of the claims are therefore intended to be embraced therein.

What is claimed is:

1. A recording and/or reproducing apparatus for a tape type optical recording medium comprising:
    scanning means for emitting a scanning beam having recording information onto the recording surface of said recording medium; and
    guide means having light-transmitting properties, said guide means comprising a mating surface which mates with said recording surface and has a recording guide track formed therein;
    wherein said scanning means controls said scanning beam in such a manner that said scanning beam is focused on and scans along said recording guide track.

2. A recording and/or reproducing apparatus as set forth in claim 1, wherein a plurality of parallel recording guide tracks are provided.

3. A recording and/or reproducing apparatus as set forth in claim 1, wherein said guide means is comprised of a flat strip.

4. A recording and/or reproducing apparatus as set forth in claim 1, wherein said guide means is cylindrical.

5. A recording and/or reproducing apparatus as set forth in claim 2, wherein said recording guide track is inclined at a predetermined angle to the longitudinal axis of said tape type recording medium.

6. A recording and/or reproducing apparatus as set forth in claim 1, wherein said guide track is comprised of a groove.

7. A recording and/or reproducing apparatus as set forth in claim 1, wherein said tape type recording medium is received on a pair of reels which are enclosed in a casing.

8. A recording and/or reproducing apparatus as set forth in claim 7, wherein said casing has a light-transmitting window through which said scanning beam is emitted onto said recording surface of said tape type recording medium.

9. A recording and/or reproducing apparatus as set forth in claim 8, wherein said guide means are arranged in said casing.

10. A recording and/or reproducing apparatus as set forth in claim 9, wherein said guide means move along with said recording medium.

11. A recording and/or reproducing apparatus as set forth in claim 10, wherein guide means are formed of a flexible material.

12. A recording and/or reproducing apparatus as set forth in claim 10, wherein said guide means are arranged in a closed-loop fashion.

13. A recording and/or reproducing apparatus as set forth in claim 12, wherein said guide means enclose said recording medium received on said pair of reels.

14. A recording and/or reproducing apparatus as set forth in claim 1, wherein said scanning means comprise a light source for emitting said scanning beam, a converging means for converging said scanning beam, and a control means for controlling said light source and said converging means so as to scan said scanning beam along said recording guide track.

15. A recording and/or reproducing apparatus as set forth in claim 14, wherein said scanning beam is selected from the group comprising visible radiation, ultraviolet radiation, infrared radiation, X-ray.

16. A recording and/or reproducing apparatus as set forth in claim 14, wherein said converging means is a convex lens.

* * * * *